M. ROCKWELL.
REMOVABLE BUGGY SEAT.
APPLICATION FILED SEPT. 11, 1911.
1,042,603.
Patented Oct. 29, 1912.
2 SHEETS—SHEET 1.
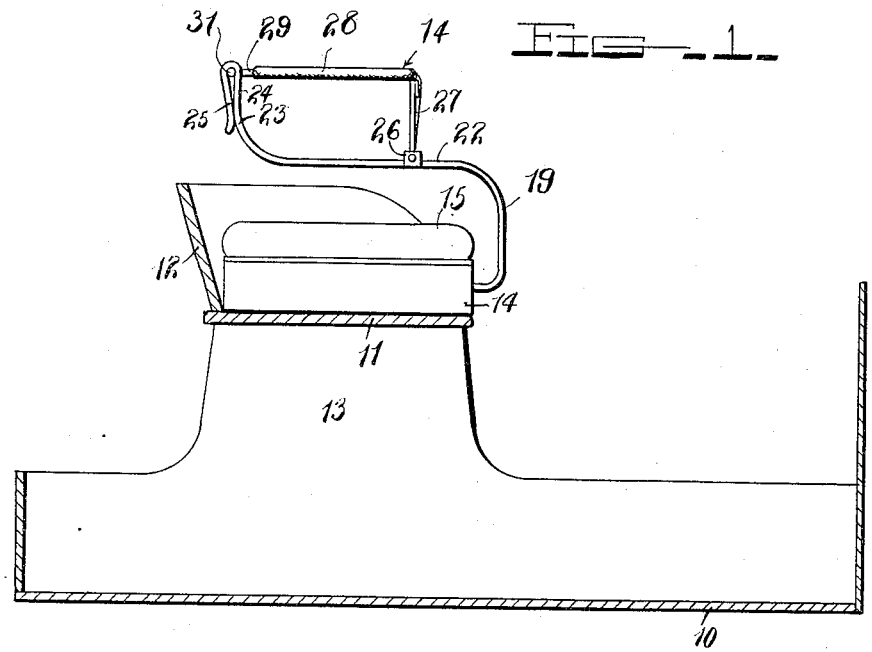
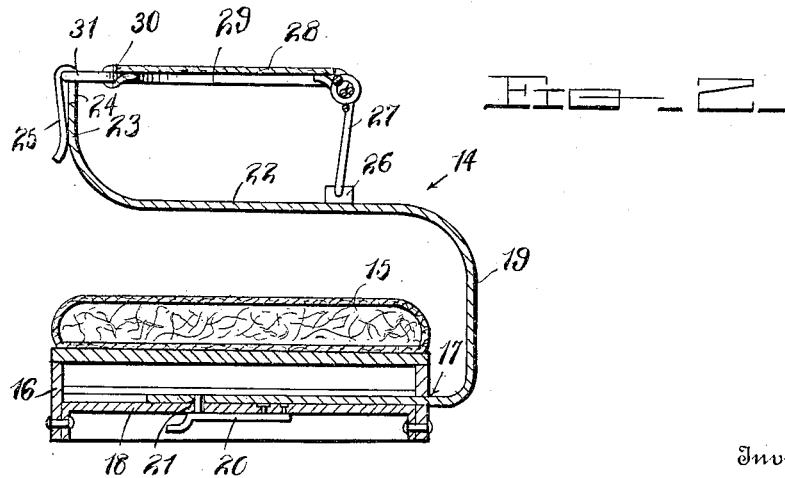
Witnesses
M. C. Fielding
Inventor
M. Rockwell.
By Chandler & Chandler
Attorneys

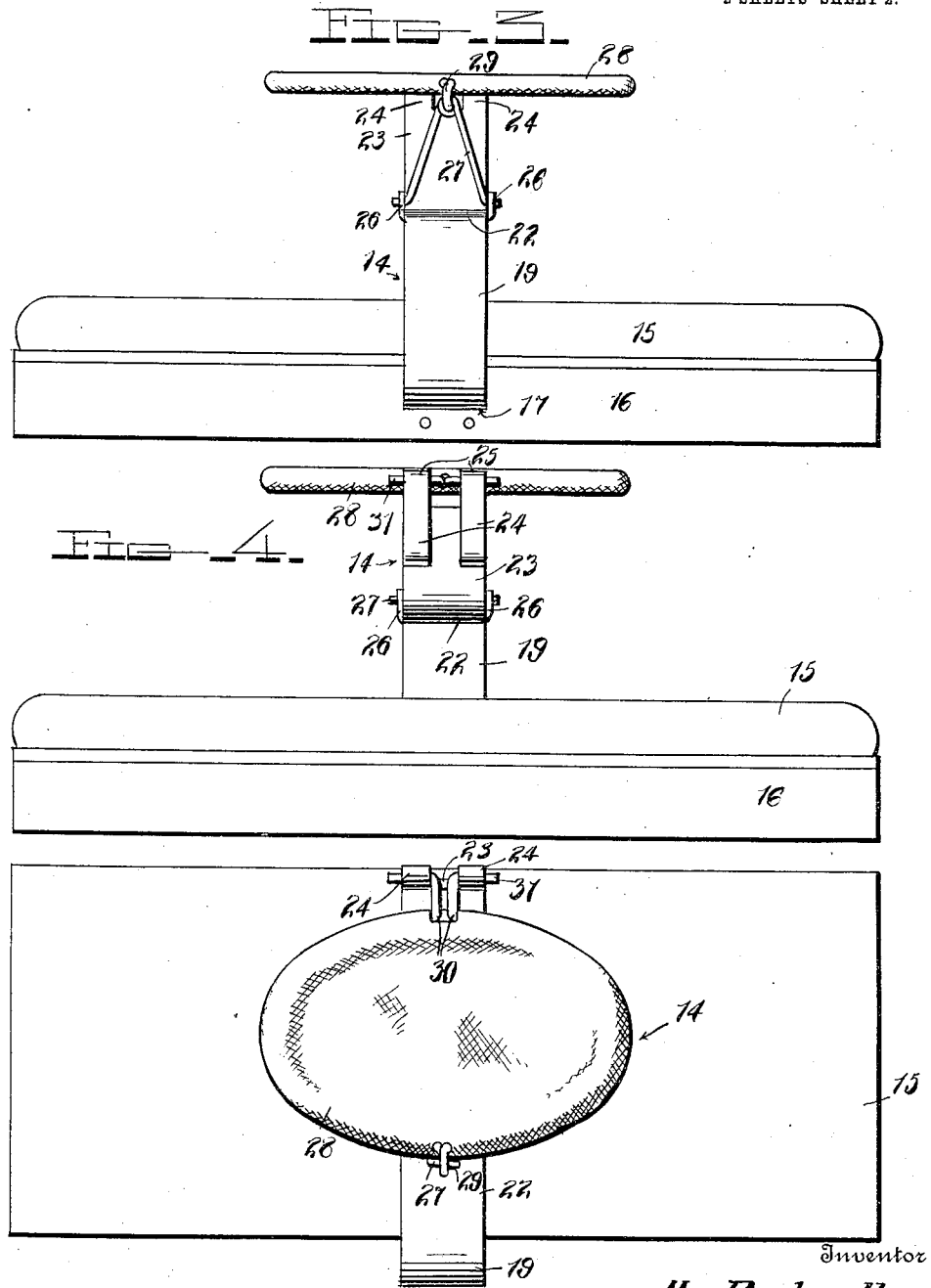

UNITED STATES PATENT OFFICE.

MARY ROCKWELL, OF BLUE RAPIDS, KANSAS.

REMOVABLE BUGGY-SEAT.

1,042,603.  Specification of Letters Patent.  Patented Oct. 29, 1912.

Application filed September 11, 1911. Serial No. 648,642.

*To all whom it may concern:*

Be it known that I, MARY ROCKWELL, a citizen of the United States, residing at Blue Rapids, in the county of Marshall, State of Kansas, have invented certain new and useful Improvements in Removable Buggy-Seats; and I do hereby declare the following to be a full, clear, and exact description of the invention, such as will enable others skilled in the art to which it appertains to make and use the same.

This invention relates to new and useful improvements in buggy seats and more particularly to that class which may be readily removed or applied to the main seat.

The object of this invention is the provision of a supplemental buggy seat of such construction that it may be contained within the main seat when not in use and which may be retained in spaced relation above the main cushion, and foldable against the back of the buggy.

A further object of this invention is the provision of a device of this character which will be comparatively simple and inexpensive to manufacture, reliable and efficient in use and readily operated.

With the above and other objects in view this invention resides in the novel features of construction, formations, combinations and arrangement of parts to be hereinafter more fully described, claimed and illustrated in the accompanying drawing in which:

Figure 1 is a longitudinal sectional view taken through a portion of a buggy showing my seat in side elevation. Fig. 2 is a longitudinal sectional view through my improved seat and the supporting cushions. Fig. 3 is a front elevation thereof. Fig. 4 is a rear elevation thereof, and Fig. 5 is a top plan view thereof.

Referring to the accompanying drawings by similar characters of reference the numeral 10 designates generally a fragment of a vehicle body in which is located the seat 11 formed with the usual back 12. The seat 11 is of the usual construction and contains the customary compartment 13 in which my improved supplemental seat 14 may be placed when not in use.

The cushion 15 is located upon the seat 11 and comprises the usual supporting frame 16 which frame is slotted in its forward side as indicated by 17 which slot registers with a guide plate 18 extending to connect the opposite sides of the frame 16.

A spring supporting member 19 is slidable through the slot 17 and guide 18 and is retained within the said guide by means of a spring clip 20 which engages an aperture 21 formed in the retaining member 19.

The spring support 19 is bent upon itself as at 22 to overlie the cushion 15 and is extended vertically as indicated by the numeral 23 at its rear extremity in spaced relation to the back of the seat 12.

The extension 23 is bifurcated as at 24 and bent downwardly producing a pair of spring clips 25 for a purpose to be later disclosed.

The forward portion of extension 22 is provided upon its opposite edges with a pair of upstanding apertured ears 26 in which are located the off-set terminals of a supporting spring 27 which is secured to the forward side of the supplemental seat 28. The seat 28 consists of a metal frame 29 to which is secured any desired covering. The ends of the metal frame 29 are extended rearwardly as at 30 and then laterally to provide a pair of arms 31 which engage the clip 25 and support the seat in its horizontal position. Obviously when the spring 27 is released from the ears 26 the seat 28 may be folded against the back 12 which permits the occupants of the vehicle to alight therefrom. It should be understood in this connection that the spring clips 25 are of sufficient force to prevent the downward displacement of the seat 28 and the disengagement of the member 31 therefrom.

From the foregoing disclosures it will be readily seen that a seat of the nature described is provided which will answer all of the necessary requirements of such a device.

Having thus fully described this invention what I claim as new and desire to protect by Letters Patent is:—

The combination in a device such as described of a buggy seat, a guide secured to the intermediate portion thereof and extending transversely thereof, a plate slidably located within said guide, means for preventing the displacement of the plate from the guide, a vertical standard formed upon the forward end of said plate in advance of the seat, said standard being off-set at its upper end to over-lie the seat, the rear extremity of the off-set portion of the standard being extended upwardly and terminating in a pair of spring clips, said clips being spaced apart, a link pivoted to the off-set portion of the standard adjacent the standard, a frame hinged to the said link, said frame being bent at its rear side to produce a pair of arms for engagement with the said spring clips, and a supplementary seat secured to the said frame.

In testimony whereof, I affix my signature, in presence of two witnesses.

MARY ROCKWELL.

Witnesses:
AMANDA ROWE,
EDNA ROCKWELL.

Copies of this patent may be obtained for five cents each, by addressing the "Commissioner of Patents, Washington, D. C."